United States Patent
Mecl et al.

(10) Patent No.: US 10,996,117 B1
(45) Date of Patent: May 4, 2021

(54) INTEGRATED ACTIVE FIBER OPTIC TEMPERATURE MEASURING DEVICE

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA); James William Wiltshire Garrow, North Vancouver (CA); Michael William Goldstein, North Vancouver (CA)

(73) Assignee: ACCELOVANT TECHNOLOGIES CORPORATION, North Vancouver (CA)

( * ) Notice: Subject to any disclaimer, the term of this patent is extended or adjusted under 35 U.S.C. 154(b) by 0 days.

(21) Appl. No.: 17/151,197

(22) Filed: Jan. 17, 2021

Related U.S. Application Data

(63) Continuation of application No. 16/888,785, filed on May 31, 2020, now abandoned.

(51) Int. Cl.
| | | |
|---|---|---|
| *G01K 11/20* | (2006.01) | |
| *G01K 15/00* | (2006.01) | |
| *G01K 1/00* | (2006.01) | |
| *G01K 11/3213* | (2021.01) | |
| *G01J 5/08* | (2006.01) | |
| *G01D 5/26* | (2006.01) | |

(52) U.S. Cl.
CPC ......... *G01K 11/3213* (2013.01); *G01D 5/268* (2013.01); *G01J 5/0821* (2013.01)

(58) Field of Classification Search
USPC .............................. 374/161, 1, 131, 120, 208
See application file for complete search history.

(56) References Cited

U.S. PATENT DOCUMENTS

| | | | | |
|---|---|---|---|---|
| 4,075,493 A | * | 2/1978 | Wickersheim | G01J 5/08 356/44 |
| 4,136,566 A | * | 1/1979 | Christensen | G01K 11/18 250/226 |
| 4,558,217 A | * | 12/1985 | Alves | G01K 15/00 250/227.23 |
| 4,750,139 A | * | 6/1988 | Dils | G01J 5/08 250/227.23 |
| 4,776,827 A | * | 10/1988 | Greaves | G01K 11/3213 250/461.1 |

(Continued)

*Primary Examiner* — Mirellys Jagan

(57) ABSTRACT

Examples of an integrated active fiber optic temperature measuring device are disclosed. The integrated temperature measuring device comprises a fiber optic probe and an optoelectronic circuitry integrated into a single device which is then individually calibrated. The fiber optic probe has a fiber bundle with an active material at the tip of the probe. The optoelectronic circuitry is connected to the fiber optic probe. The optoelectronic circuitry includes a light source configured to provide an excitation light to the active material, a detector to detect the emitted light, a processing unit configured to determine a temperature based on a change in an emission intensity at a single wavelength range or the change in intensity ratio of two or more wavelength ranges, a lifetime decay, or a shift in emission wavelength peak of the emitted light, and a calibration means configured to calibrate the integrated active fiber optic temperature sensor.

13 Claims, 2 Drawing Sheets

(56) References Cited

U.S. PATENT DOCUMENTS

| | | | | |
|---|---|---|---|---|
| 4,789,992 A | * | 12/1988 | Wickersheim | G01K 11/3213 |
| | | | | 250/458.1 |
| 4,895,156 A | * | 1/1990 | Schulze | A61B 5/1459 |
| | | | | 250/458.1 |
| 4,988,212 A | * | 1/1991 | Sun | G01D 5/268 |
| | | | | 250/227.11 |
| 5,741,074 A | | 4/1998 | Wang et al. | |
| 6,045,259 A | * | 4/2000 | Djeu | G01K 11/3213 |
| | | | | 374/161 |
| 6,243,654 B1 | | 6/2001 | Johnson et al. | |
| 6,283,632 B1 | * | 9/2001 | Takaki | G01K 11/18 |
| | | | | 374/1 |
| 7,876,989 B2 | | 1/2011 | Aronson et al. | |
| 8,046,188 B2 | | 10/2011 | Kinugasa et al. | |
| 8,123,403 B2 | | 2/2012 | Ichida et al. | |
| 8,193,726 B2 | | 6/2012 | Kinugasa et al. | |
| 8,308,357 B2 | | 11/2012 | Kinugasa et al. | |
| 8,337,079 B2 | | 12/2012 | Kinugasa et al. | |
| 8,751,188 B2 | | 6/2014 | Belak | |
| 10,793,772 B1 | * | 10/2020 | Johnson | C09K 11/02 |
| 2004/0104336 A1 | * | 6/2004 | Melnyk | G01D 5/268 |
| | | | | 250/227.14 |
| 2007/0237462 A1 | | 10/2007 | Aronson et al. | |
| 2009/0129725 A1 | | 5/2009 | Durrant et al. | |

\* cited by examiner

INTEGRATED ACTIVE FIBER OPTIC TEMPERATURE MEASURING DEVICE

TECHNICAL FIELD

The present disclosure generally relates to a fiber optic temperature measuring device and more particularly to an integrated active fiber optic temperature measuring device where the fiber optic probe is integrated with opto-electronics into a single compact assembly.

BACKGROUND

Unless otherwise indicated herein, the materials described in this section are not prior art to the claims in this application and are not admitted to be prior art by inclusion in this section.

A fiber optic temperature sensor such as a phosphor thermometer is a device that uses luminescence emitted from the phosphor to determine the temperature of an object. Typically, thermographic phosphors when excited with light within a certain wavelength range, emit a light within a different wavelength range. Certain characteristics of the emitted light change with temperature including brightness, color, and afterglow duration. The response of the emitted light to temperature is monitored by various methods, such as analyzing the change in emission intensity at a single wavelength range or the change in intensity ratio of two or more wavelength ranges, lifetime decay, or shift in emission wavelength peak. Phosphor used for measuring the temperature of an object is either coated directly on the surface or placed within a probe and brought in contact with the surface, which is then illuminated with a light source and the temperature of the object is determined based on the response of the emitted light.

Standard fiber optic temperature measuring systems known in the prior art comprise a fiber optic probe with an active material at its tip which is connectable to an opto-electronics housing via a fiber optical connector. The fiber optic connector can be on the optoelectronics side or of the fiber optic probe side or both and allows separation of the probe from the optoelectronics. The ability to separate the probe and the opto-electronics in the known fiber optic temperature measuring systems is necessary for maintenance and installation purposes due to the size of the opto-electronics circuitry since such systems require a free space optical splitter which increases the size of the opto-electronics housing. The free space optical splitter usually incorporates 3 collimator lenses and a cold mirror to form an optical path for the excitation light directed to the active material and for the emitted light coming back from the active material. Thus, in the typical fiber optic temperature sensors the fiber probe and the opto-electronics are interchangeable, meaning if the probe is inaccurate the user can remove the probe and connect a new probe or vice versa if the opto-electronics needs maintaining or replacement the user can replace it by connecting a new opto-electronics housing. However, such interchangeable configurations (non-integrated configurations) of the fiber optic temperature measuring systems often provide inaccurate measurements. Current state of the accuracies achieved with the interchangeable fiber optic temperature sensors are in order of +/−0.5° C. The inaccuracy of the known interchangeable fiber optic temperature sensors is a combination of the opto-electronics converter inaccuracy, variability of optical path attenuation and inaccuracy contribution from inherent variability of photonic response of the active sensing materials. In optics there is an inherent problem with active material repeatability. The active materials are complex ceramics with variable stoichiometry resulting in non-repeatable temperature/decay dependency. Therefore, a very common problem in the fiber optic thermometer industry is maintaining batch to batch repeatability of the active material. This is a very difficult problem and usually involves sorting the sensing elements according to certain optical characteristics to select only those elements that satisfy the narrower, more accurate requirement, thus yielding fewer usable components that meet the requirements. A common approach to work around the problem of variation of active material is to have a "matching pair" of the fiber probe and the opto-electronics, meaning that a single particular optical sensor is calibrated together to match a particular opto-electronics circuit, however the accuracy in such case can only be achieved if that particular pair of fiber optic probe and opto-electronics is used for measurement. This is hard to achieve especially when deploying large quantities and the final user/customer needs to find the right matching pair. In addition, when the fiber optics or the opto-electronics fail and need to be discarded, the new (interchangeable) fiber optic probe or electronics will not meet specification and will not be a match to the other component.

In addition, excitation energy variation caused by variability of the optical path attenuation may also cause accuracy limitations.

SUMMARY

In one aspect, an integrated active fiber optic temperature measuring device is provided. The integrated active fiber optic temperature measuring device as provided comprises a fiber optic probe and optoelectronic circuitry with a housing that is permanently connected to the fiber optic probe. The fiber optic probe has a fiber bundle and an active material functionally coupled to a first end of the probe. The optoelectronic circuitry is permanently connected to a second end of the fiber optic probe and includes a light source aligned with the fiber bundle and configured to provide an excitation light to the active material, a driver operatively coupled to the light source to trigger the light source, a detector aligned with the fiber bundle to detect the emitted light and a processing unit operatively coupled to the light source and the detector and configured to determine a temperature based on analyzing the change in emission intensity at a single wavelength range or the change in intensity ratio of two or more wavelength ranges, lifetime decay, or shift in emission wavelength peak. The optoelectronic circuitry further comprises a power supply and a calibration means coupled to the processing unit and configured to calibrate the integrated active fiber optic temperature sensor by compensating for any differences in photonic behaviors of the active material and variability in optical coupling losses in the optoelectronic circuitry to correct for the relationship of a thermal input and an electrical output of the device so that the integrated device is individually calibrated to achieve higher accuracy.

In another aspect, the fiber bundle includes an excitation light guide bundle operatively coupled to the light source to deliver the excitation light to the active material, and an emitted light guide bundle operatively coupled to the detector to transmit emitted light to the detector. A bundle splitter can further be used to split a single fiber bundle into the excitation light guide bundle and the emitted light guide bundle.

In yet another aspect, the device is powered via 4-20 mA current loop.

In one aspect, the active material is thermographic phosphor.

In another aspect, the active material is a monolithic ceramic metal oxide phosphor composite that comprises a thermographic phosphor and a metal oxide material.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

DETAILED DESCRIPTION OF SPECIFIC EMBODIMENTS

Figure 1:
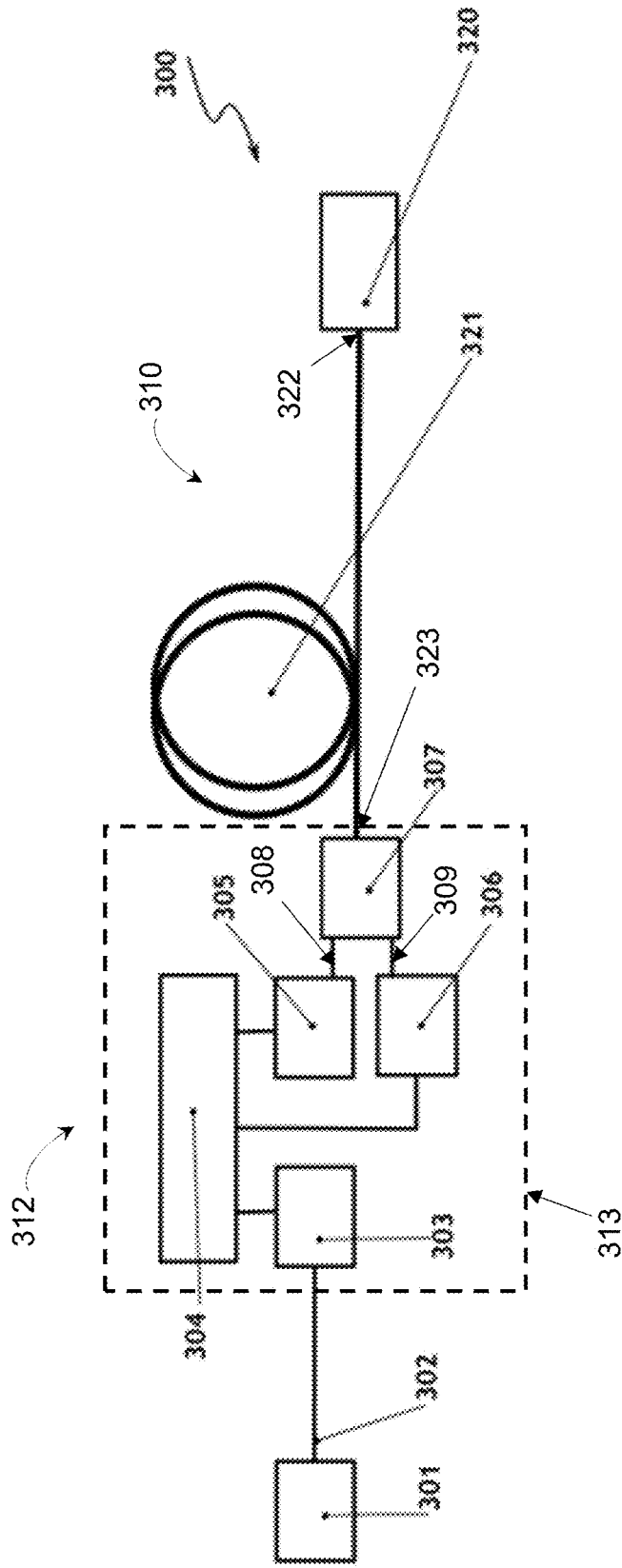
FIG. 1 is a schematic view of an example of an integrated active fiber optic temperature measuring device.

FIG. 1 illustrates an example of a fiber optic temperature measuring device 300 that integrates a fiber optic probe 310 and an opto-electronic circuit 312 in a single entity which is then possible to individually calibrate. This way each individual fiber optic temperature measuring device 300 undergo custom calibration as a part of production to achieve high measuring accuracy. For example, the fiber optic temperature measuring device of the present invention can achieve accuracy of about +/−0.05° C. and is ten times more accurate than the prior art fiber optic temperature measuring devices where the fiber optics and the electronics are interchangeable.

The fiber optic probe 310 comprises a fiber bundle 321 and a sensor with an active material 320. The fiber bundle has a first end 322 and a second end 323. The active material is positioned near the tip of the sensor 320. The sensor 320 is functionally coupled to the first end 322 of the fiber bundle 321. The second end 323 of the fiber bundle 321 is permanently connected to the opto-electronic circuit 312. In one implementation, the active material is a thermographic phosphor which when illuminated with an excitation light emits light in a wavelength different from the excitation light. For example, the excitation light can be UV light with a wavelength between 200-400 nm or light in the blue to green wavelength range (e.g. 400-600 nm). When the active material is illuminated with such excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak.

The fiber bundle 321 is configured to transmit the excitation light and the emitted light. In one embodiment, the fiber bundle can comprise an excitation light guide (not shown) for transmitting the excitation light to the active material and an emitted light guide (not shown) for transmitting light emitted from the active material.

Figure 2:
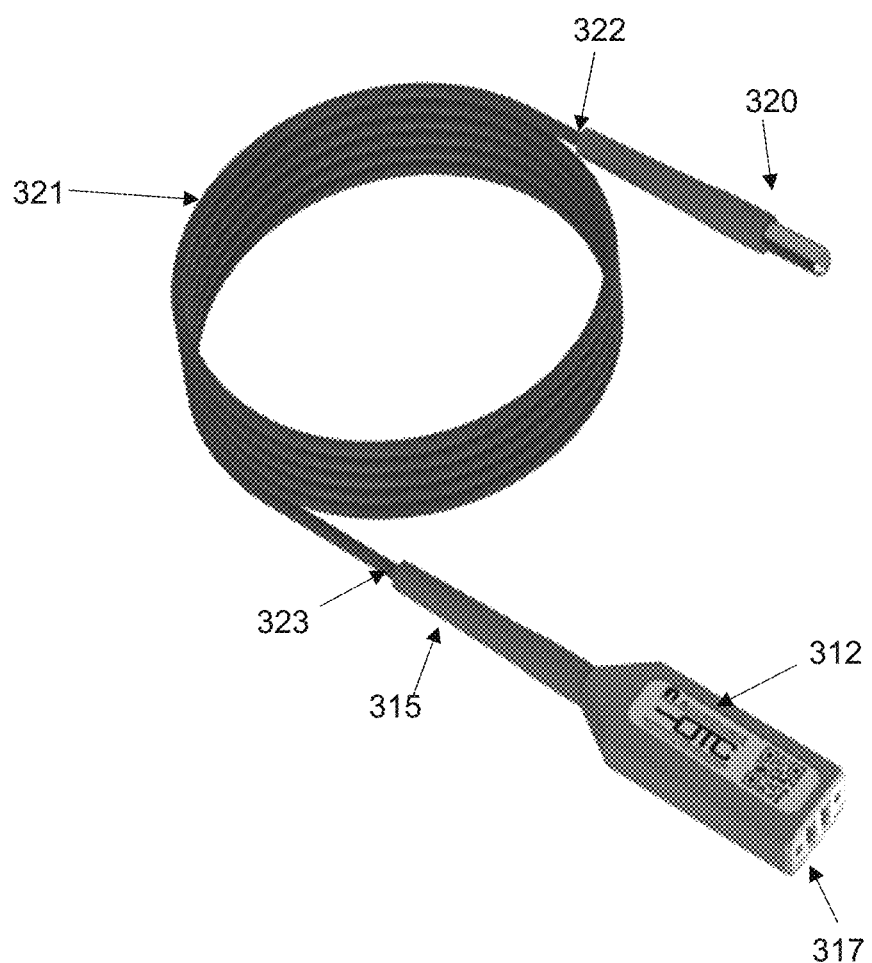
FIG. 2 is a photograph of an example of an integrated active fiber optic temperature measuring device showing a fiber optic probe permanently connected to an opto-electronic circuit housing.

The second end 323 of the fiber bundle 321 is permanently connected to the opto-electronic circuit 312. A housing 313 encloses the opto-electronics circuit 312. The housing 313 can be made of a molded plastic or any other suitable material and can have an inner cavity that houses the opto-electronics circuit 312, a port 315 (see FIG. 2) through which the second end 323 of the fiber bundle 321 in connected to the opto-electronic circuit 312 and a communication interface 317. In one embodiment, the second end 323 is inserted into the port 315 and then is permanently bonded therein. In another embodiment, the second end 323 can be permanently connected to the housing port 315 using an adhesive. By permanently connecting the fiber bundle 321 to the opto-electronic housing 313 an integrated (overmolded) design of the fiber probe 310 and the opto-electronics 312, as illustrated in FIG. 2, is provided.

The opto-electronics 312 comprises a light source 305 that is operatively coupled to the second end 323 of the fiber bundle 321 to provide the excitation light to the active material in the sensor 320. A driver (not shown) is also provided to trigger the light source. The light source can be a laser or a LED that is configured to provide excitation light in the UV waveband between 200-400 nm, or in the blue to green wavelength range (e.g. 400-600 nm). The driver can be any suitable switching device that switches the light source 305 on and off. The opto-electronics 312 further comprises a detector 306 configured to receive the light emitted from the active material. In one implementation, the detector 306 can be a photodiode. The photodiode 306 can convert the optical signal (emitted light) into an analog electrical signal. The photons absorbed by the photodetector (e.g. photodiode) generate an electrical current. The electrical signal can be intensified using an amplifier (not shown) and then the analog electrical signal can be digitized using an A/D converter (not shown).

In one implementation, the light source 305 is aligned with the excitation light guide of the fiber bundle so that the excitation light enters and is transmitted to the active material by the excitation light guide. On the other hand, the detector 306 is aligned with the emitted light guide, so that the light emitted from the active material is transmitted to the detector 306. In one embodiment, the fiber bundle 321 can transmit both the excitation and the emitted light (no separate excitation and the emitted light guides). A fiber bundle splitter 307 can be provided to split a single fiber bundle (e.g. fiber bundle 321) into an excitation light guide 308 and an emitted light guide 309 thus allowing to use one portion of a fiber bundle 321 as a path to deliver excitation light to the sensor 320 and using the remaining portion of the fiber bundle 321 to guide the emitted light back to the photodetector 306. Integration of the fiber bundle splitter 307 replaces the free space optical splitter used in the prior devices therefore allowing the opto-electronics housing to be sized much smaller. The opto-electronics 312 and the fiber splitter 307 can be included on a single small printed circuit board which yields an overall small integrated fiber optic temperature measuring device 300.

The opto-electronics 312 further comprises a processing unit 304 that is operatively coupled to the driver of the light source 305 and the detector 306, so that it can control the triggering time of the light source 305 and/or its intensity/ wavelength and process detected emitted light detected from the detector 306. The processing unit 304 processes the digital signal obtained from the A/D converter in order to determine a change in an emission intensity at a single wavelength range or the change in intensity ratio of two or more wavelength ranges, a lifetime decay, or a shift in emission wavelength peak each of which is a function of the temperature measured. For example, the detector 306 can have multiple regions tuned for sensitivity of different wavelengths that allow measurement of emission intensity at different wavelengths. A predetermined lookup table with the emission intensity at a single wavelength range or the change in intensity ratio of two or more wavelength ranges, a lifetime decay, or a shift in emission wavelength peak and measured parameter values is pre-programed into the processing unit 304. Therefore, the processing unit 304 processes the digital signal and calculates a change in an emission intensity at a single wavelength range or the change in intensity ratio of two or more wavelength ranges, a lifetime decay, or a shift in emission wavelength peak of the light emitted from the active material, and using the lookup table, the processing unit 304 determines the measured temperature value based on such calculated value.

The opto-electronic circuit 312 further comprises a power supply 303 to power the device 300. In one implementation, the power supply 303 can be a loop power supply with a transmitter. For example, the power supply 303 can be a 4-20 mA current loop. In such case the power supply 303 can be coupled to a 4-20 mA readout unit with power 301 using a 4-20 mA loop field wiring 302. The 4-20 mA readout unit with power 301 and the 4-20 mA loop field wiring 302 are not integrated in the opto-electronics circuit 312.

The opto-electronic circuit 312 further comprises a calibration means coupled to the processing unit 304 to calibrate each individual device 300 so that the fiber probe 310 is matched to the opto-electronic circuit 312. In the illustrated example shown in FIG. 1, the calibration means are incorporated into the processing unit 304. Each of the integrated devices 300 undergo custom calibration as a part of the production. The integrated device is calibrated using standard drywell or bath calibration methods utilized in conventional temperature sensor calibrations. Response signal for each individual sensor 320 with a pre-determined known active material of the fiber optic probe 310 (e.g., emission intensity at a single wavelength range or the change in intensity ratio of two or more wavelength ranges, a lifetime decay, or a shift in emission wavelength peak) is recorded in predetermined setpoints (in 10° C. increments) in the desired temperature range, for example from 50° C. to 450° C. The sensor 320 is tested with a traceable reference thermometer that is inserted in a dry block calibrator. Temperature is stabilized at each setpoint and the response signal (e.g. decay time) and reference thermometer (for example traceable SPRT—secondary platinum record thermometer) readings are recorded. A custom lookup table correlating the response signal (e.g., decay time) and temperature readings is generated based on the results and uploaded to a non-volatile memory of the processing unit 304, including an identification for traceability purposes. The temperature readings are reported with linear (or other) interpolation in between the calibration points during measurements. A verification of calibration is performed by repeating this process and reporting any temperature deviation of the device under test from the reference thermometer. Reference setup uncertainty is established prior to the calibration and recorded on the calibration report.

Calibration of each individual integrated fiber optic temperature measuring device 300 allows for minimization of all previously mentioned inaccuracies of the prior art devices to 0.05° C. The calibration curve specific to a given integrated fiber probe sensor (active material)/opto-electronic pair is enabling high accuracy and allowing for calibration to be performed on each individual sensor.

In one implementation, the active material is monolithic ceramic metal oxide phosphor composite described in a co-pending U.S. patent application Ser. No. 16/844,880 incorporated here by reference. The phosphor in the monolithic ceramic metal oxide phosphor composite can be any thermographic phosphor. The thermographic phosphor can be selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof. The metal oxide is selected from a group of Silica ($SiO_2$), Zirconia ($ZrO_2$), Alumina ($Al_2O_3$), Titania ($TiO_2$) and any combination thereof.

The integrated active fiber optic device of the present invention integrates a fiber optic measuring probe with an active material on its tip and an opto-electronics circuit into single device. A single device 300 incorporates driving circuitry (light source with a driver), receiving circuitry, a processing unit and calibration data connected to an individual sensor.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An integrated active fiber optic temperature measuring device comprising:
    a fiber optic probe with a fiber bundle having a first end and a second end, and a sensor with an active material, the sensor being functionally coupled to the first end so that when the active material is illuminated with an excitation light it emits light in a wavelength different from the excitation light and the fiber bundle being configured to transmit the excitation light and the emitted light; and
    an optoelectronic circuitry having a housing permanently connected to the second end of the fiber bundle including:
        a light source aligned with the fiber bundle and configured to provide the excitation light to the active material;
        a driver operatively coupled to the light source to trigger the light source;
        a detector aligned with the fiber bundle to detect the emitted light;
        a processing unit operatively coupled to the driver of the light source and the detector, the processor determining a temperature based on a change in an emission intensity at a single wavelength range or the change in an intensity ratio of two or more wavelength ranges, a lifetime decay, or a shift in emission wavelength peak of the emitted light;
        a power supply in electrical communication with the driver and the processing unit to provide power thereto; and
        a calibration means coupled to the processing unit configured to calibrate the integrated active fiber optic temperature sensor by compensating for any differences in photonic behaviors of the active material and variability in optical coupling losses in the optoelectronic circuitry to correct for the relationship of a thermal input and an electrical output of the device such that the integrated fiber optic temperature measuring device is individually calibrated to achieve higher accuracy.

2. The integrated active fiber optic temperature measuring device of claim 1, wherein the detector is a photodiode.

3. The integrated active fiber optic temperature measuring device of claim 1, wherein the light source provides excitation light in a wavelength range of 200-600 nm.

4. The integrated active fiber optic temperature measuring device claim 1, wherein the calibration means comprises a memory for storing a custom lookup table correlating decay time of the active material and a measured temperature as recorded at predetermined setpoints and at predetermined temperatures.

5. The integrated active fiber optic temperature measuring device of claim 1, wherein the fiber bundle includes an excitation light guide operatively coupled to the light source to deliver the excitation light to the active material, and an emitted light guide operationally coupled to the detector to transmit the emitted light to the detector.

6. The integrated active fiber optic temperature measuring device of claim 5, further comprising a fiber splitter to split a single fiber bundle into the excitation light guide the emitted light guide.

7. The integrated active fiber optic temperature measuring device of claim 1, further comprising a communication interface coupled to the optoelectronic circuitry.

8. The integrated active fiber optic temperature measuring device of claim 1, wherein the power supply is a loop power supply with a transmitter configured to power the fiber optic temperature measuring device.

9. The integrated active fiber optic temperature measuring device of claim 8, wherein the device is powered via a 4-20 mA current loop.

10. The integrated active fiber optic temperature measuring device of claim 1, wherein the active material is a thermographic phosphor.

11. The integrated active fiber optic temperature measuring device of claim 10, wherein the thermographic phosphor is selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof.

12. The integrated active fiber optic temperature measuring device of claim 10, wherein the active material is a monolithic ceramic metal oxide phosphor composite.

13. The integrated active fiber optic temperature measuring device of claim 12, wherein the metal oxide is selected from a group of Silica ($SiO_2$), Zirconia ($ZrO_2$), Alumina ($Al_2O_3$), Titania ($TiO_2$) and combination thereof.

* * * * *